(12) United States Patent
Lotter et al.

(10) Patent No.: US 12,393,024 B2
(45) Date of Patent: Aug. 19, 2025

(54) OPTICAL SYSTEM FOR A MICROSCOPE

(71) Applicant: LEICA MICROSYSTEMS CMS GMBH, Wetzlar (DE)

(72) Inventors: Andreas Lotter, Wetzlar (DE);
Christian Schulz, Wetzlar (DE);
Christian Schumann, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 18/441,028

(22) Filed: Feb. 14, 2024

(65) Prior Publication Data

US 2024/0184104 A1 Jun. 6, 2024

Related U.S. Application Data

(63) Continuation of application No. 17/423,924, filed as application No. PCT/EP2019/086268 on Dec. 19, 2019, now Pat. No. 11,933,972.

(30) Foreign Application Priority Data

Jan. 30, 2019 (DE) ..................... 10 2019 102 330.0

(51) Int. Cl.
 *G02B 21/00* (2006.01)
 *G02B 15/14* (2006.01)
 (Continued)

(52) U.S. Cl.
CPC ....... *G02B 27/0025* (2013.01); *G02B 15/143* (2019.08); *G02B 15/20* (2013.01); *G02B 21/025* (2013.01); *G02B 21/36* (2013.01)

(58) Field of Classification Search
CPC .............. G02B 21/00; G02B 21/0004; G02B 21/0012; G02B 21/0016; G02B 21/002;
(Continued)

(56) References Cited

U.S. PATENT DOCUMENTS 8,536,543 B2 9/2013 Iketaki
10,133,063 B2 11/2018 Schulz et al.
(Continued)

FOREIGN PATENT DOCUMENTS

CN 102096180 A 6/2011
CN 102175644 A 9/2011
(Continued)

OTHER PUBLICATIONS

Gross, Herbert, ed., "Handbook of Optical Systems," vol. 4, ISBN 978-3-527-40380-6, Wiley-VCH, Weinheim, Germany, Feb. 2008, pp. 478-482.

*Primary Examiner* — Thong Q Nguyen
(74) *Attorney, Agent, or Firm* — LEYDIG, VOIT & MAYER, LTD.

(57) ABSTRACT

An optical system for a microscope for imaging an object includes: a telescope system having an optical correction unit, which is adjustable in order to correct a spherical imaging aberration, and having a zoom optical unit, which is adjustable in order to adapt a magnification of the telescope system to a ratio of two refractive indices, one of which is assigned to an object side and an other of which is assigned to an image side, within a predetermined magnification range. The telescope system is telecentric over an entire magnification range both with respect to the object side and with respect to the image side by the zoom optical unit contained in the telescope system.

15 Claims, 12 Drawing Sheets

(51) Int. Cl.
*G02B 15/20* (2006.01)
*G02B 21/02* (2006.01)
*G02B 21/36* (2006.01)
*G02B 27/00* (2006.01)

(58) Field of Classification Search
CPC ............ G02B 21/0024; G02B 21/0028; G02B 21/0032; G02B 21/0052; G02B 21/006; G02B 21/0064; G02B 21/0072; G02B 21/0076; G02B 21/008; G02B 21/0084; G02B 21/0088; G02B 21/02; G02B 21/025; G02B 21/06; G02B 21/24; G02B 21/241; G02B 21/33; G02B 21/34; G02B 21/36; G02B 21/365; G02B 21/367; G02B 27/0025
USPC .................................................. 359/368–398
See application file for complete search history.

(56) References Cited

U.S. PATENT DOCUMENTS

| | | | |
|---|---|---|---|
| 10,288,877 B2* | 5/2019 | Suzuki | G02B 21/367 |
| 11,300,782 B2 | 4/2022 | Goegler et al. | |
| 11,933,972 B2* | 3/2024 | Lotter | G02B 21/361 |
| 2006/0114554 A1 | 6/2006 | Suzuki et al. | |
| 2010/0142037 A1 | 6/2010 | Nakayama | |
| 2011/0082590 A1 | 4/2011 | Fahlbusch et al. | |
| 2014/0168763 A1 | 6/2014 | Winterot | |
| 2017/0017071 A1* | 1/2017 | Ue | G01N 21/41 |
| 2017/0363864 A1 | 12/2017 | Margolis | |
| 2019/0049711 A1 | 2/2019 | Schumann | |
| 2019/0243118 A1 | 8/2019 | Schumann | |
| 2023/0035107 A1 | 2/2023 | Schumann | |

FOREIGN PATENT DOCUMENTS

| | | |
|---|---|---|
| CN | 108627963 A | 10/2018 |
| DE | 102008026774 A1 | 12/2009 |
| DE | 102012223712 A1 | 6/2014 |
| DE | 102016103182 A1 | 8/2017 |
| DE | 102016119268 B3 | 12/2017 |
| JP | H05340869 A | 12/1993 |
| JP | 2015118227 A | 6/2015 |
| WO | WO 2009031549 A1 | 3/2009 |
| WO | WO 2017/015077 A1 | 1/2017 |

* cited by examiner ations filed on Jan. 30, 2019, all of which applications are hereby incorporated by reference herein in their entireties.

OPTICAL SYSTEM FOR A MICROSCOPE

CROSS-REFERENCE TO PRIOR APPLICATIONS

This application is a continuation of U.S. application Ser. No. 17/423,924, now U.S. Pat. No. 11,933,972, filed on Jul. 19, 2021, which is a U.S. National Stage application under 35 U.S.C. § 371 of International Application No. PCT/EP2019/086268, filed on Dec. 19, 2019, claiming benefit to German Patent Application No. DE 10 2019 102 330.0, filed on Jan. 30, 2019, all of which applications are hereby incorporated by reference herein in their entireties.

FIELD

The present invention relates to an optical system for a microscope for imaging an object. Furthermore, the invention relates to a microscope comprising such an optical system, and to a method for imaging an object using a microscope.

BACKGROUND

Optical systems which enable volume imaging of a sample are known in the field of microscopy. In contrast to conventional microscope imaging, in which the sample to be examined is generally imaged in a plane perpendicular to the optical axis, such volume imaging enables the imaging of a sample region extending into the depth of the sample. For this purpose, microscopes are preferably used which illuminate only a thin layer of the sample with a planar illumination light distribution, also referred to as a light sheet, wherein the light sheet in this specific application is often positioned obliquely with respect to the optical axis.

Microscopes designed for volume imaging generally comprise a telescope system that images the target region of the sample from the object space into the image space. In order to enable imaging largely free of aberrations, the magnification of the telescope system should be chosen such that it corresponds to the ratio of the refractive indices which have the optical media arranged in the object space and image space. These refractive indices generally differ from one another. The condition for volume imaging free of aberrations, namely the adaptation of the magnification of the telescope system to the ratio of the object-side refractive index to the image-side refractive index, can be satisfied only with difficulty particularly for the microscope examination of biological samples. In this regard, in a biological sample, the refractive index thereof often varies significantly with the imaging depth within the sample, which results in a corresponding variation of the abovementioned refractive index ratio to which the magnification of the telescope system is to be adjusted.

Sample-dictated refractive index mismatches are particularly disadvantageous in conventional microscope applications since the optical systems used there often have a high numerical aperture. The spherical imaging aberrations associated with a refractive index mismatch are therefore of a corresponding magnitude.

SUMMARY

In an embodiment, the present invention provides an optical system for a microscope for imaging an object, comprising: a telescope system having an optical correction unit, which is adjustable in order to correct a spherical imaging aberration, and having a zoom optical unit, which is adjustable in order to adapt a magnification of the telescope system to a ratio of two refractive indices, one of which is assigned to an object side and an other of which is assigned to an image side, within a predetermined magnification range, wherein the telescope system is telecentric over an entire magnification range both with respect to the object side and with respect to the image side by the zoom optical unit contained in the telescope system.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
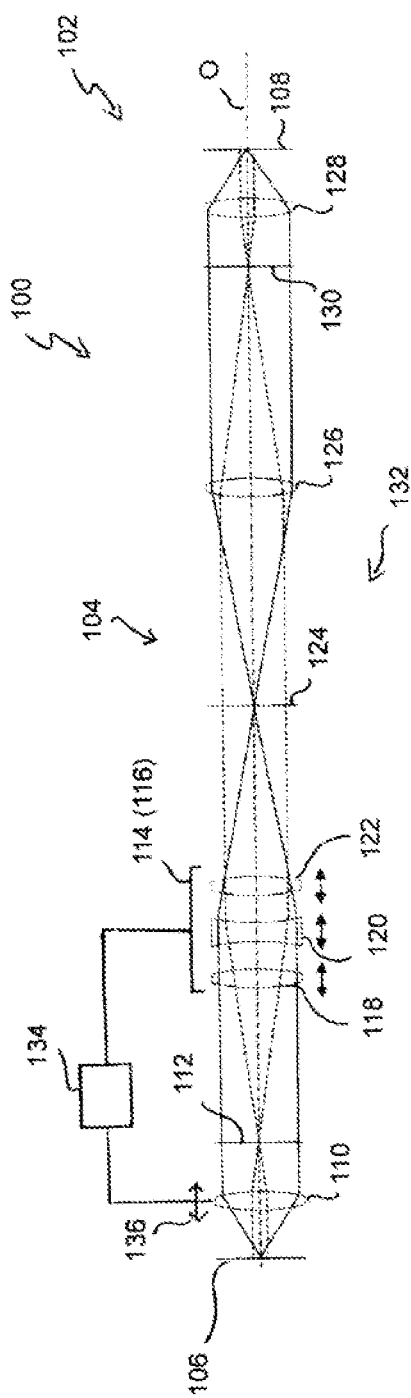
FIG. 1 shows a schematic illustration of a microscope having an optical system in accordance with one exemplary embodiment.

In an embodiment, the present invention provides an optical system which is provided for a microscope and which enables object imaging largely free of aberrations regardless of possible differences in the refractive indices in the object space and image space. Furthermore, in an embodiment, the present invention provides a microscope comprising an optical system, and a method for imaging an object using such a microscope.

An optical system intended for a microscope is proposed, comprising a telescope system having an optical correction unit, which is adjustable in order to correct a spherical imaging aberration, and having a zoom optical unit, which is adjustable in order to adapt the magnification of the telescope system to the ratio of two refractive indices, one of which is assigned to the object side and the other of which is assigned to the image side, within a predetermined magnification range, wherein the telescope system is embodied as telecentric over the entire magnification range both with respect to the object side and with respect to the image side by means of the zoom optical unit contained in said telescope system.

In this embodiment, the zoom optical unit enables a variable zoom adjustment depending on the refractive index mismatch present in the specific microscope application. In particular, with the aid of the zoom optical unit, the magnification can be adjusted to a value that is substantially equal to the ratio between the refractive index in the object space and the refractive index in the image space.

As part of the telescope system the zoom optical unit ensures that the telescope system is embodied as telecentric as a whole on both sides, i.e. both with respect to the object space and with respect to the image space. For this purpose, the zoom optical unit forms in particular a so-called pupil-regulated zoom system enabling volume imaging. One example of such a zoom pupil-regulated zoom system is described in H. Gross, Handbook of Optical Systems, vol. 4, ISBN 978-3-527-40380-6, Wiley-VCH Weinheim 2008, pp. 478-482.

In the present embodiment, the afocal telescope system furthermore contains an optical correction unit used to correct a spherical imaging aberration that occurs particularly in the case of high numerical apertures. Two degrees of freedom for adjusting the telescope system are thus realized with the zoom optical unit and the aforementioned correction unit, which degrees of freedom, depending on the application, can be used in each case by themselves or jointly for sample imaging largely free of aberrations. Preferably, both the zoom optical unit and the correction unit can be adjusted in a motorized manner.

In one preferred embodiment, the telescope system contains a first objective facing the object side, and a second objective facing the image side. Furthermore, the zoom optical unit is preferably configured such that it images the focal plane—facing the image side—of the first objective onto the focal plane—facing the object side—of the second objective over the entire magnification range. This imaging property characterizes the zoom optical unit as a pupil-regulated zoom system enabling volume imaging largely free of aberrations even in the case of a variable refractive index mismatch. The property of the zoom optical unit, acting as a pupil-regulated system can also be understood such that the zoom optical unit images the pupil of the object-side objective onto the pupil of the image-side objective over the entire magnification or zoom range, the aforementioned objectives being embodied as telecentric systems.

The correction unit is preferably contained in the first objective or in the second objective. In this embodiment, the correction unit is formed for example from an objective lens group that can be adjusted along the optical axis of the objective in order to correct the spherical imaging aberration. Since, for the case where the magnification of the telescope system is adapted to the ratio of the refractive indices in the object space and image space, the two objectives have identical aperture angles, the choice as to which of the two objectives is to be equipped with the correction unit can be made freely. This enables a particularly flexible optical set-up.

In one preferred development, the magnification range of the telescope system corresponds to a range in which the ratio of the two refractive indices is between 1.0 and 1.6. If the zoom optical unit is configured for realizing such a magnification range, then sample-induced refractive index mismatches can be compensated for within wide limits.

In one preferred configuration, the telescope system contains a Kepler telescope system arranged between the first objective and the second objective, the zoom optical unit being contained in said Kepler telescope system. With such a Kepler telescope system, the afocal telescope system can be realized in a comparatively simple manner.

Preferably, the Kepler telescope system contains two tube lens units, one of which forms the zoom optical unit. In this regard, the zoom optical unit is given e.g. by that one of the two tube lens units which is situated on the object side of an intermediate image plane lying within the Kepler telescope system.

In a further preferred embodiment, the zoom optical unit contains at least three lens units which are movable preferably independently of one another along the optical axis of the telescope system in order to change the magnification thereof. Each of the aforementioned lens units constitutes a degree of freedom for the desired pupil regulation.

In one particularly preferred embodiment, the optical system comprises a focusing device configured to move the first objective along the optical axis thereof relative to the object, as a result of which the distance between the first objective and the Kepler telescope system changes. Furthermore, the three lens units of the zoom optical unit are movable along the optical axis independently of one another in such a way that as the distance between the first objective and the Kepler telescope system changes, the focal plane—facing the image side—of the first objective is imaged onto the focal plane—facing the object side—of the second objective while maintaining the magnification adjusted by the zoom optical unit and the afocality of the telescope system. In this embodiment, so-called objective focusing is realized, that is to say focusing which involves moving the objective facing the object (but not, for instance, a microscope stage carrying the object) along the optical axis in order to perform the desired focusing. In the case of such objective focusing, the three lens units of the zoom optical unit offer three controllable degrees of freedom given by the positions of the three lens units along the optical axis, the possibility of using the pupil regulation to adjust the pupil imaging freely within limits. As a result, during objective focusing that varies the axial distance between the object-side objective and the Kepler telescope system and thus also the imaging of the image-side focal plane of said objective by the Kepler telescope system, it is possible to adjust the position of the image of the aforementioned image-side focal plane and the position of an intermediate image lying in the Kepler telescope system. As a result, it is possible, in particular, by means of suitable driving of the individual lens units of the zoom optical unit, to maintain the telecentricity on both sides even with the use of objective focusing, e.g. turret focusing. In order to be able to adjust the three adjustment variables, namely telecentricity, afocality and magnification scale, independently of one another in this case, provision is advantageously made for driving the three degrees of freedom given by the axial positions of the three lens groups of the zoom optical unit independently of one another.

In one preferred embodiment, the optical system comprises a device configured to detect the refractive index assigned to the object space, and a controller configured to adjust the optical correction unit and the zoom optical unit depending on the detected refractive index. The aforementioned detecting device can be designed for example to measure the refractive index in situ and to feed it to the controller as a control parameter. In a simplified configuration, however, this device can also serve merely to enable the user to effect an input that makes the refractive index available to the controller as a control parameter.

In one particularly preferred embodiment, the controller is configured to adjust the optical correction unit and the zoom optical unit coupled to one another depending on the detected refractive index. Such a coupled adjustment means that the two degrees of freedom of adjustment originally available, namely the correction adjustment and the zoom adjustment, are reduced to a single degree of freedom. This can be effected for example by way of predefining a working plane, onto which the telescope system is focused. This predefinition of a fixed working plane within the object results in the implementation of a fixed coupling between zoom adjustment and correction adjustment in the telescope system, such that the value for the single degree of freedom that remains correlates only with the object-side refractive index, but not with the imaging depth within the sample. With knowledge of the refractive index, an optimum value of the aforementioned degree of freedom can thus be determined.

In a further refined embodiment, provision is furthermore made of a device configured to detect the distance between the telescope system and a reference plane defining the position of the object relative to the telescope system. The controller is then preferably configured to adjust at least the optical correction unit additionally depending on the detected distance. As reference plane, the surface of a cover glass can be used, for example, on the basis of which it is possible to determine the distance between the object and the telescope system along the optical axis thereof. In this alternative embodiment, therefore, in contrast to the embodiment described above, the two degrees of freedom given by the correction adjustment and the zoom adjustment are no longer fixedly coupled to one another. With knowledge of the distance between the telescope system and the reference plane, and at the same time with knowledge of the object-side refractive index, both the spherical correction for the currently adjusted object plane and the magnification ratio can be adjusted to the ratio between the object-side refractive index and the image-side refractive index. In this way, an optimum correction of the volume imaging can be achieved in an automated manner for every position along the optical axis within the object.

In a further embodiment, the telescope system contains a light deflecting device arranged within the telescope system at the location of an intermediate pupil. The intermediate image plane can be generated with the aid of a further telescope system, for example. The light deflecting device can be used profitability in particular in an application appertaining to light sheet microscopy, e.g. for generating the light sheet as such and/or for adjusting the latter in order to scan the sample with the light sheet.

According to a further aspect, a microscope comprising an optical system of the type described above is provided.

Such a microscope can be embodied as a light sheet microscope, for example. In particular, the microscope is configured e.g. in the form of an OPM or SCAPE microscope suitable for volume imaging. In this case, OPM stands for "oblique plane microscope" and SCAPE stands for "swept confocally aligned planar excitation". These two microscope configurations are distinguished by the fact that the sample is illuminated and imaged by means of one and the same objective in each case. In these configurations this has the consequence that the generated light sheet lies obliquely with respect to the optical axis. Accordingly, in an OPM or SCAPE configuration, it is also ensured that the detection plane, i.e. that plane within the sample which is imaged onto the detector, is aligned obliquely with respect to the optical axis.

According to a further aspect of the invention, a method for imaging an object using a microscope comprising a telescope system containing an optical correction unit and a zoom optical unit is furthermore provided. The method provides the following steps: correcting a spherical imaging aberration by adjusting the optical correction unit, and adapting the magnification of the telescope system within a predetermined magnification range to the ratio of two refractive indices, one of which is assigned to the object side and the other of which is assigned to the image side, by adjusting the zoom optical unit. The method furthermore provides for the refractive index assigned to the object side to be detected and the optical correction unit and the zoom optical unit to be adjusted depending on this refractive index.

In one preferred embodiment, a working plane is predefined, onto which the telescope system is focused. The optical correction unit and the zoom optical unit coupled to one another are adjusted depending on the detected refractive index. In this embodiment, therefore, the two degrees of freedom of adjustment, namely the adjustment of the correction unit and the adjustment of the zoom optical unit, are coupled to one another to form a single degree of freedom, wherein this degree of freedom that remains correlates only with the object-side refractive index.

In a further embodiment, the distance between the telescope system and a reference plane defining the position of the object relative to the telescope system is detected. At least the optical correction unit is adjusted additionally depending on the detected distance. In this case, the two degrees of freedom of the correction and zoom adjustments are not fixedly coupled to one another.

The schematic illustration according to FIG. 1 shows an optical system 100, which is part of a microscope designated generally by 102 in FIG. 1. Only those components of the microscope 102 which are required for understanding the exemplary embodiment are illustrated in FIG. 1 (and also in the further figures).

The optical system 100 according to FIG. 1 comprises a telescope system 104 used to image an object 106 lying in an object space into an image space, i.e. to generate an image 108 of the object 106. For this purpose, the telescope system 104 contains, proceeding from the object side toward the image side, a first objective 110 having a back, i.e. image-side, focal plane 112, a zoom optical unit 114, which, in the present exemplary embodiment, forms a first tube lens unit 116 and is formed from three lens units 118, 120, 122, which are movable along the optical axis O of the telescope system 104, an intermediate image plane 124, a second tube lens unit 126 and a second objective 128 having a back, i.e. in the present configuration object-side, focal plane 130. The two tube lens units 114, 126 form a Kepler telescope system 132. The telescope system 104 furthermore has an optical correction unit, which, in the present exemplary embodiment, is integrated in the object-side objective 110 and is used to correct a spherical imaging aberration. An exemplary embodiment of the correction unit will be explained in greater detail later with reference to FIG. 8.

The zoom optical unit 114 has the function of adapting the magnification of the telescope system 104 within a predetermined magnification range to the ratio of two refractive indices, one refractive index of which is assigned to an optical medium in the object space and the other refractive index of which is assigned to an optical medium in the image space. In this case, the object-side refractive index can relate for example to an embedding medium into which the object 106 is embedded, or to the object 106 itself. Particularly if the microscope 102 is used for volume imaging, for imaging largely free of aberrations it may be necessary to know the refractive index within the object depending on the imaging depth.

In order to adjust a desired magnification, in the present exemplary embodiment one or more of the lens units 118, 120, 122 of the zoom optical unit 114 are moved along the optical axis O. A concrete axial positioning of the lens units 118, 120, 122 thus corresponds to a specific zoom adjustment, which in turn brings about the desired magnification of the telescope system 104.

The optical system 100 according to FIG. 1 has a controller 134, by way of which the correction unit integrated in the object-side objective 110 and the zoom optical unit 114 are drivable in order to perform the desired correction adjustment and the desired zoom adjustment, respectively.

In the present exemplary embodiment, the zoom optical unit 114 is configured as a pupil-regulated zoom system. Accordingly, the zoom optical unit 114 images the image-side focal plane 112 of the object-side objective 110 onto the object-side focal plane 130 of the image-side objective 128 over the entire magnification range, i.e. for all zoom adjustments. As shown by the pupil beam path illustrated in a dashed manner in FIG. 1, this means that the zoom optical unit 114 images the pupil of the object-side objective 110 onto the pupil of the image-side objective 128 over the entire magnification or zoom range. In this case, the two objectives 110, 128 themselves are embodied as telecentric systems. As a result, the telescope system 104 thus forms as a whole a telecentric system on both sides, i.e. both with respect to the object side and with respect to the image side.

In the present exemplary embodiment, the optical system 100 can furthermore have a focusing device, which is indicated purely schematically by a double-headed arrow 136 in the illustration according to FIG. 1. The focusing device 136 is drivable by way of the controller 134 in such a way that it moves the object-side objective 110 as a whole along the optical axis O toward or away from the object 106 in order to focus on a desired plane within the object 106. This axial movement of the objective 110 changes the distance of the image-side focal plane 112 thereof with respect to the Kepler telescope system 132 formed from the two tube lens units 114, 126. So-called objective focusing is thus realized in the exemplary embodiment shown in FIG. 1.

In order to be able to compensate for the abovementioned change in distance in the case of such objective focusing, the three lens units 118, 120, 122 of the zoom optical unit 114 are drivable independently of one another. In this way, the pupil imaging can be controlled in such a way that, within the predetermined magnification range, any desired magnification scale can be adjusted and at the same time the telecentricity on both sides and also the afocality of the telescope system 104 are maintained.

In the present exemplary embodiment, the axial adjustment travels of the lens units 118, 120, 122 forming the zoom optical unit 114 are chosen such that the range within which the magnification of the telescope system 104 can be varied corresponds to a range in which the ratio between the object-side refractive index and the image-side refractive index lies between 1.0 and 1.6.

In the exemplary embodiment illustrated in FIG. 1, the adjustment of the correction unit integrated in the objective 110 and the adjustment of the zoom optical unit 114 are coupled to one another. As a result of this coupling, the two degrees of freedom of adjustment actually available, namely the correction adjustment and the zoom adjustment, are reduced to a single degree of freedom, which is controlled depending on the object-side refractive index in the present case. In this regard, the object plane onto which the telescope system 104 is focused is predefined in the exemplary embodiment according to FIG. 1. Said object plane defines a fixed working plane within the object 106, such that the imaging depth is defined. Consequently, solely the refractive index assigned to the object space remains as a control parameter taken as a basis for performing the correction of spherical aberration and the zoom adjustment. Said refractive index can be fed to the controller 134 for example via an input device (not shown in FIG. 1).

In a modified embodiment by comparison therewith, the refractive index can also be measured in situ by the microscope 102 itself. Such a modification is shown in FIG. 2.

Figure 2:
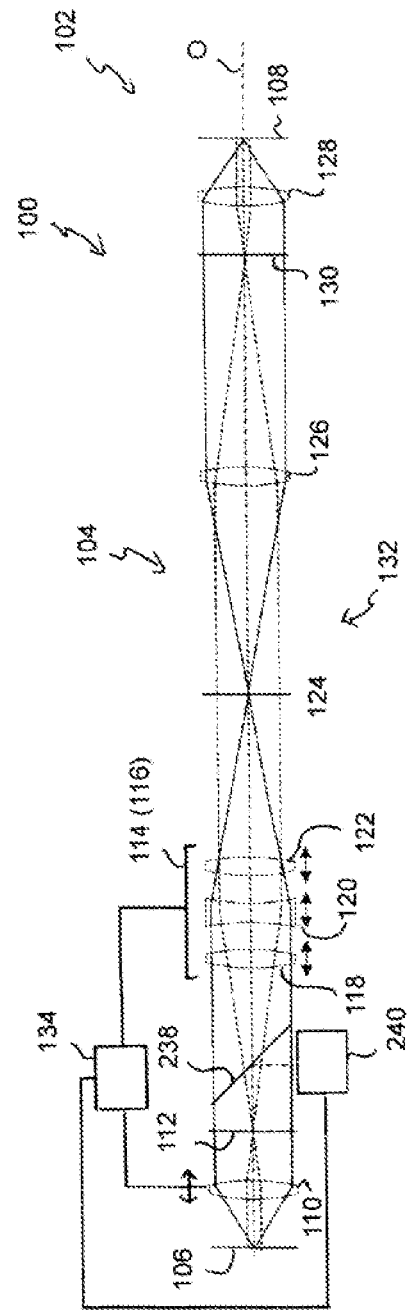
FIG. 2 shows a schematic illustration of a modified embodiment of the microscope according to FIG. 1.

The microscope 102 according to FIG. 2 additionally has a splitter mirror 238 and a detecting device 240 configured to detect the refractive index in the object space in situ. The splitter mirror 238 and the detecting device 240 are illustrated in detail in FIG. 3.

Figure 3:
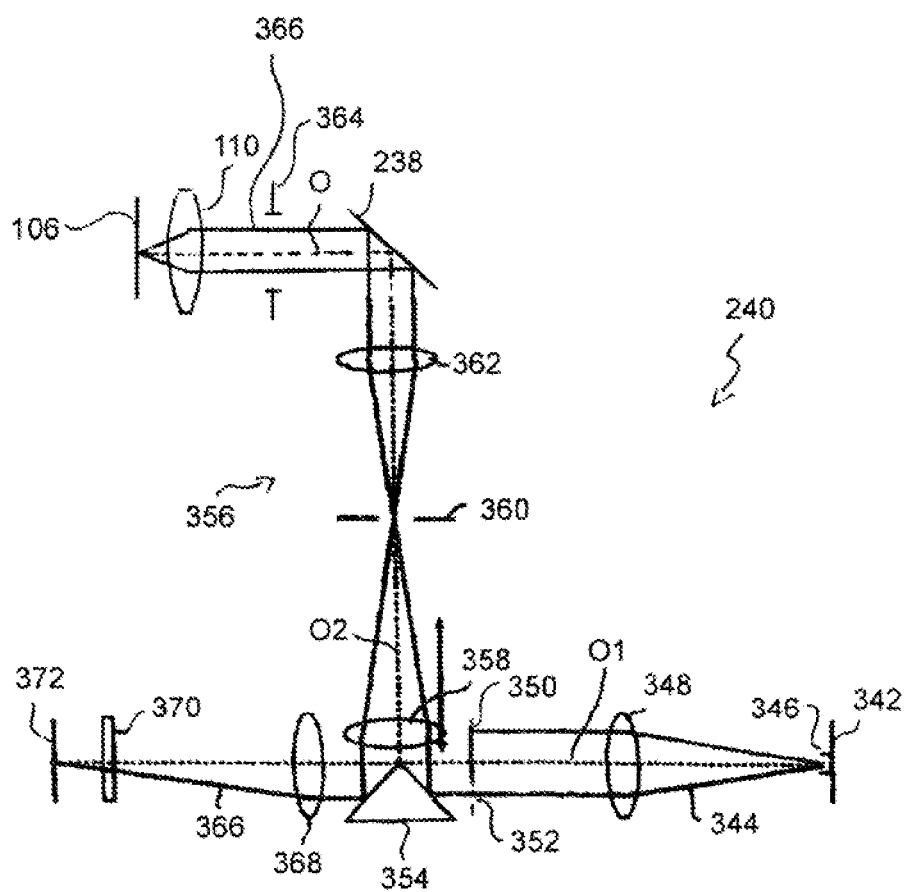
FIG. 3 shows a schematic illustration of a device suitable for determining a refractive index in the object space in the optical system according to FIG. 2.

As shown in FIG. 3, the detecting device 240 has a light source 342, which emits a measurement light beam 344 in the infrared wavelength range. The light source 342 is for example an LED having a slit stop 346, through which the measurement light beam 344 is directed onto an illumination optical unit 348. After passing through the illumination optical unit 348, the measurement light beam 344 is incident on an aperture stop 350, which is positioned centrally on the optical axis O1 of the illumination optical unit 348 and has a stop opening 352 arranged in a decentered manner at a distance from the optical axis O1. The stop opening 352 of the aperture stop 350 delimits the beam cross-section of the measurement light beam 344 in such a way that only that part of the measurement light beam 344 which lies below the optical axis O1 of the illumination optical unit 348 in FIG. 3 passes through the aperture stop 350 in the direction of a deflection prism 354.

The measurement light beam 344 delimited in terms of its beam cross-section is reflected at the deflection prism 354 into a transport optical unit 356 formed from a focusing lens 358, which is displaceable along its optical axis O2, a stray light stop 360 and a further lens 362. After passing through the transport optical unit 356, the measurement light beam 344 is incident on the splitter mirror 238, which is embodied as a dichroic beam splitter. The splitter mirror 238 reflects light in the infrared wavelength range, while it transmits light in the visible range. The splitter mirror 238 reflects the measurement light beam 344 in the direction of the objective 110. In this case, the measurement light beam 344 reflected at the splitter mirror 238 passes with a parallel offset with respect to the optical axis O of the objective 110. In this way, the measurement light beam 344 is guided into a partial region of an entrance pupil 364 of the objective 110 that is offset laterally relative to the optical axis O of the objective 110 and thus relative to the center of the entrance pupil 364 (also cf. FIG. 4). The entrance pupil 364 of the objective 110 is thus decentrally underilluminated, which has the effect that the measurement light beam 344 is directed into the object space at an angle α obliquely with respect to the optical axis O.

Figure 4:
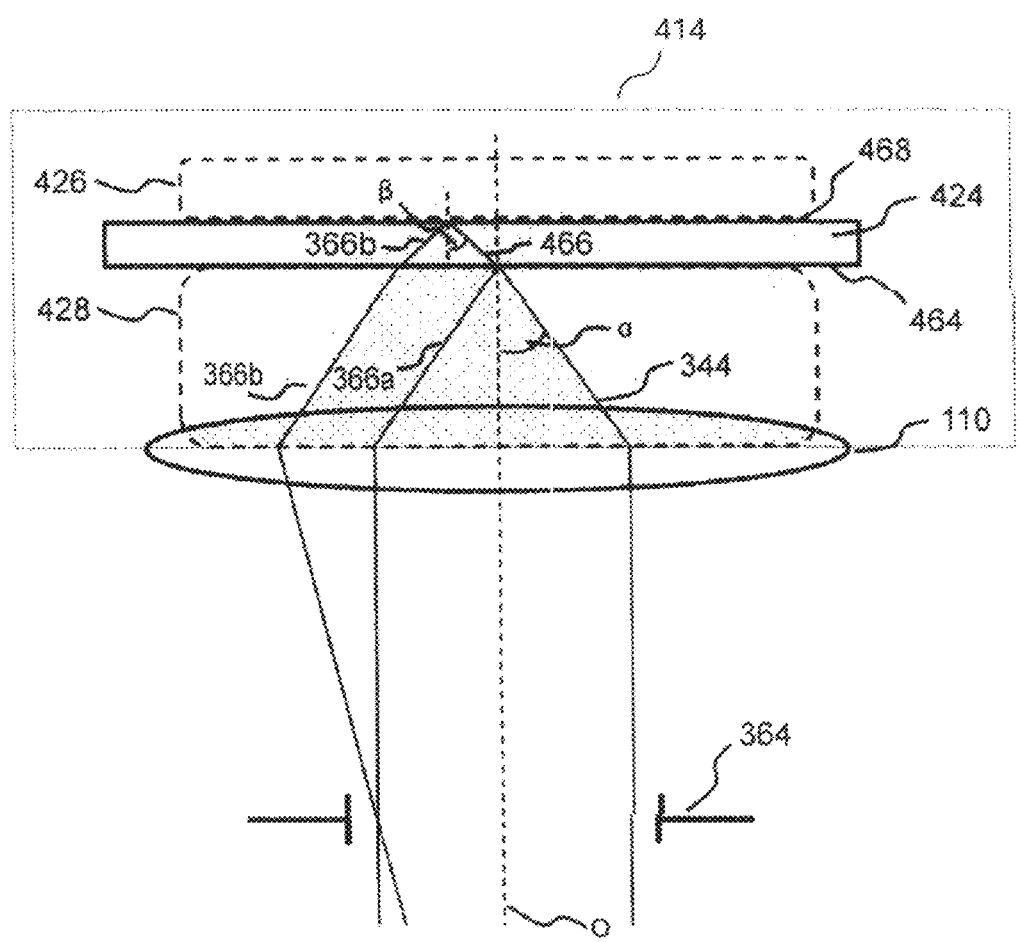
FIG. 4 shows an object space of the microscope according to FIG. 2 for elucidating how the refractive index is determined by means of the device according to FIG. 3.

Referring to FIG. 4, it shall be assumed for the present exemplary embodiment that a cover glass 424 is situated in the object space of the microscope 102, said cover glass being used to cover the object (not explicitly illustrated in FIG. 4). An embedding medium 426 is situated on the cover glass 424, the object being embedded into said embedding medium. Furthermore, an immersion medium 428 is arranged in the object space 414, said immersion medium adjoining the objective 110 from above and the cover glass 424 from below in the illustration according to FIG. 4.

The embedding medium 426 and the immersion medium 428, which adjoin the cover glass 424 from opposite sides in the object space, have been omitted in FIG. 3, for the sake of simplicity. The measurement light beam 344 guided into the object space with oblique incidence is reflected at the cover glass 424, as explained in more specific detail further below with reference to FIG. 4, thus giving rise to two reflection light beams that are guided back into the objective 110, said reflection light beams being illustrated in the form of a single light beam designated by 366 in the schematic view according to FIG. 3 (in contrast to the detailed view according to FIG. 4).

After passing through the objective 110, the two reflection light beams 366 are incident on the splitter mirror 238, which directs the reflection light beams 366 into the transport optical unit 356. After passing through the transport optical unit 356, the reflection light beams 366 are incident on the deflection prism 354, which reflects the reflection light beams 366 onto a detector optical unit 368. The detector optical unit 368 directs the reflection light beams 366 onto a spectral filter 370, which is transmissive only to light in the infrared wavelength range and blocks stray light outside this wavelength range. The reflection light beams 366 transmitted through the spectral filter 370 are finally incident on a position-sensitive detector 372, which is able to detect the intensities of the reflection light beams 366 in a spatially resolved manner.

FIG. 4 shows in more specific detail how the two reflection light beams (designated by 366 a, 366 b in FIG. 4) are generated by reflection of the measurement light beam 344, said reflection light beams used for determining the refractive index of the embedding medium 426 in the present exemplary embodiment. Accordingly, the measurement light beam 344 decentrally underilluminating the entrance pupil 364 of the objective 110 is directed through the objective 110 onto the front surface of the cover glass 424, said front surface facing the objective 110 and being designated by 464 in FIG. 4, at the angle a obliquely with respect to the optical axis O. Since the cover glass 424 and the immersion medium 428 adjoining the front surface 464 of said cover glass have different refractive indices, the front surface 464 of the cover glass 424 and the immersion medium 428 adjoining the latter form a first interface, at which the incident measurement light beam 344 is partly reflected. That part of the measurement light beam 344 which is reflected at said first interface generates the first reflection light beam 366 a, which is guided back into the objective 110.

The other part 466 of the measurement light beam 344, this other part being transmitted by the first interface, upon entering the cover glass 424, is refracted away from the optical axis O of the objective 110 and forms an angle ß with said optical axis, which angle is greater than the angle α. This transmitted part 466 of the measurement light beam 344 is partly reflected at a second interface defined by the rear surface 468 of the cover glass 424 and the embedding medium 426 adjoining the latter and having a different refractive index than the cover glass 424. This second partial reflection of the measurement light beam 344 at the second interface generates the second reflection light beam 366b, which passes through the front surface 464 of the cover glass 424 and then passes back into the objective 110.

As is elucidated in the illustration according to FIG. 4, the oblique incidence of the measurement light beam 344 in the object space ensures that the reflection light beams 366a, 366b generated by the two partial reflections at the front surface 464 and respectively the rear surface 468 of the cover glass 424 pass back into the objective 110 on different optical paths. In this way, the two reflection light beams 366a, 366b impinge on the position-sensitive detector 372 at different locations of incidence. In other words, the two measurement patterns generated in the form of the slit images at the front surface 464 and respectively the rear surface 468 of the cover glass 424 are imaged onto the position-sensitive detector 372 in a manner spatially separated from one another, as is elucidated in the diagram according to FIG. 5.

Figure 5:
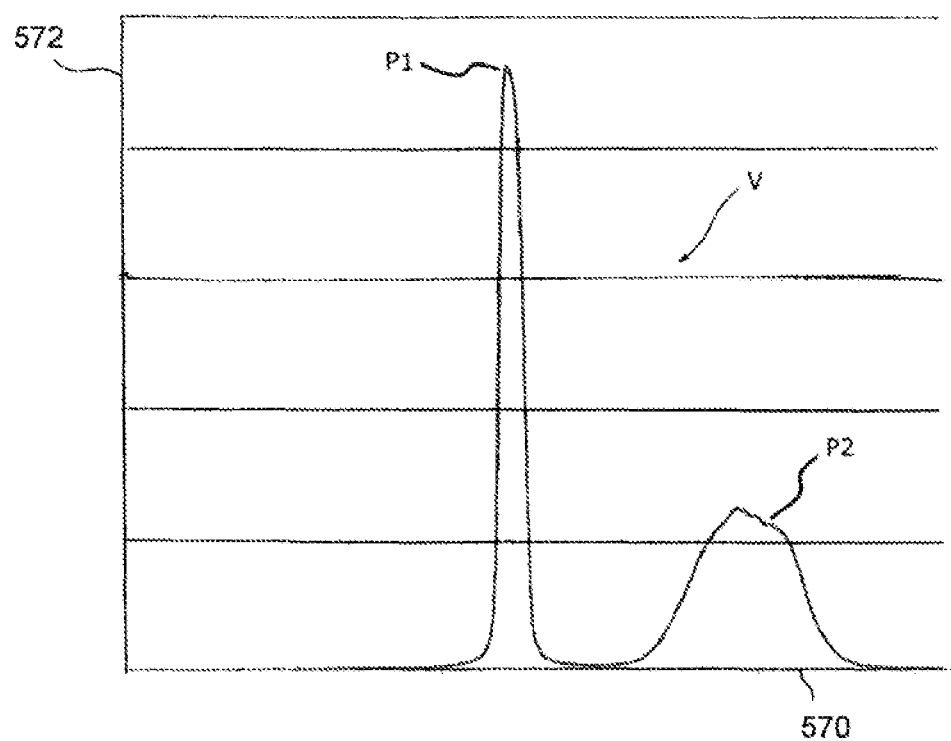
FIG. 5 shows an intensity distribution detected by a position-sensitive detector of the device according to FIG. 3 for determining the refractive index.

FIG. 5 shows an exemplary intensity distribution V produced by the two reflection light beams 366a, 366b jointly on the position-sensitive detector 372. In this case, the abscissa 570 of the diagram indicates the location of incidence on the detector 372 and the ordinate 572 indicates the intensity measured at the respective location of incidence. The intensity distribution V according to FIG. 5 shows two peaks, of which the peak designated by P1 is assigned to the first reflection light beam 366a and the peak designated by P2 is assigned to the second reflection light beam 366b. The fact that the peak P1 is higher and sharper than the peak P2 reveals that in the example according to FIG. 4 the measurement light beam 344 is focused onto the front surface 464 of the cover glass 424. This means that a focused image of the slit stop 346 of the light source 342 is generated at the front surface 464 of the cover glass 424, while a defocused image of the slit stop 346 by comparison therewith arises at the rear surface 468 of the cover glass 424. This corresponds to the illustration according to FIG. 4 insofar as the first partial reflection at the front surface 464 of the cover glass 424 takes place at a point which is centered on the optical axis O of the objective 110. By contrast, the second partial reflection at the rear surface 468 of the cover glass 424 takes place at a point offset with respect thereto transversely with respect to the optical axis O. The areas below the peaks P1, P2 shown in FIG. 5 are in each case a measure of the intensity of the respective reflection light beam 366a, 366b.

In the present example it shall be assumed that the numerical aperture of the measurement light beam 344 and also the refractive indices of the immersion medium 428 and of the cover glass 24 are known. With knowledge of these variables, the refractive index of the embedding medium 426 can be calculated from the ratio of the intensities of the peaks P1 and P2 that is determined in situ.

In the exemplary embodiment according to FIG. 2, the refractive index determined by the detecting device 240 in situ in the manner explained above constitutes a control parameter that is fed to the controller 134. On the basis of this control parameter, the controller 134, as described above, performs a coupled adjustment of the correction unit and the zoom optical unit 114. It goes without saying here that the aforementioned control parameter is not restricted to the refractive index of an embedding medium. In particular, the refractive index of the object itself can also be used as a control parameter.

The exemplary embodiment illustrated in FIG. 2 can furthermore be modified by the two available degrees of freedom of adjustment, namely the correction adjustment and the zoom adjustment, being controlled independently of one another. In this case, a further control parameter is added, corresponding for example to the distance between the telescope system 104 and a reference plane, wherein said reference plane defines the position of the objective 110 relative to the telescope system 104. In order to detect this additional control parameter in situ, the detecting device 240 shown in FIGS. 2 and 3 can be operated in a manner elucidated by way of example in FIG. 6.

Figure 6:
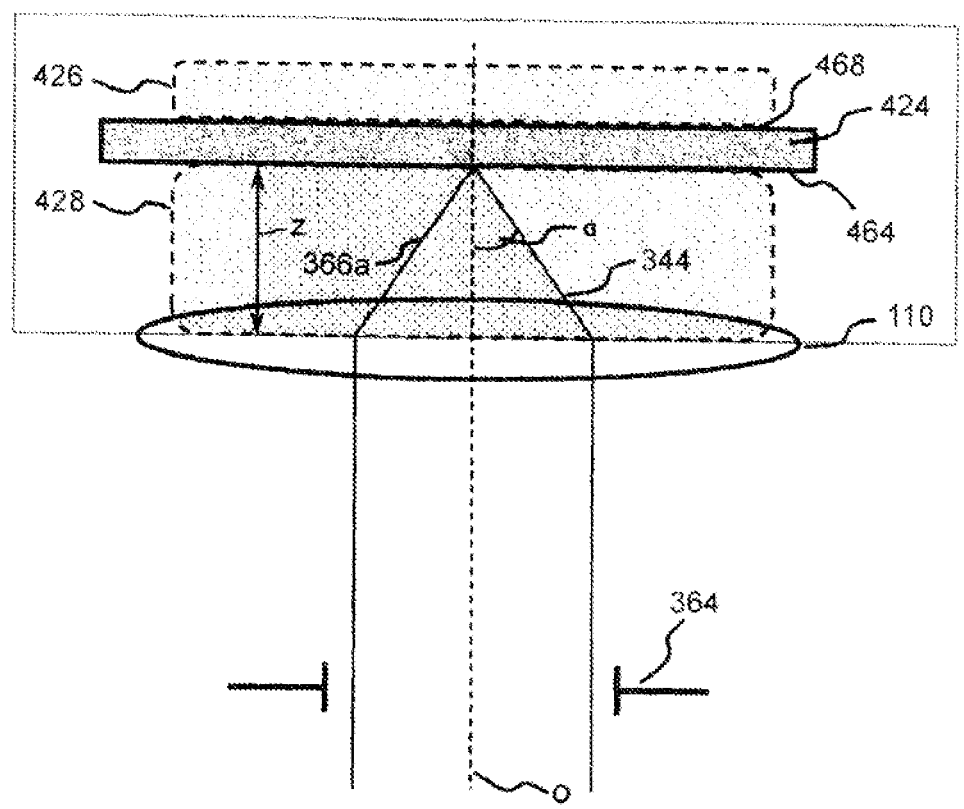
FIG. 6 shows the object space of the microscope according to FIG. 2 for elucidating how the distance between the optical system and a cover glass is determined by means of the device according to FIG. 3.

In the example according to FIG. 6, in contrast to the situation in FIG. 4, solely the reflection of the measurement light beam 344 at the front surface 464 of the cover glass 424 is taken into account. Accordingly, only that part of the measurement light beam 344 is evaluated which is reflected at the interface formed by the front surface 464 of the cover glass 424 and the immersion medium 428 adjoining the latter.

Figure 7:
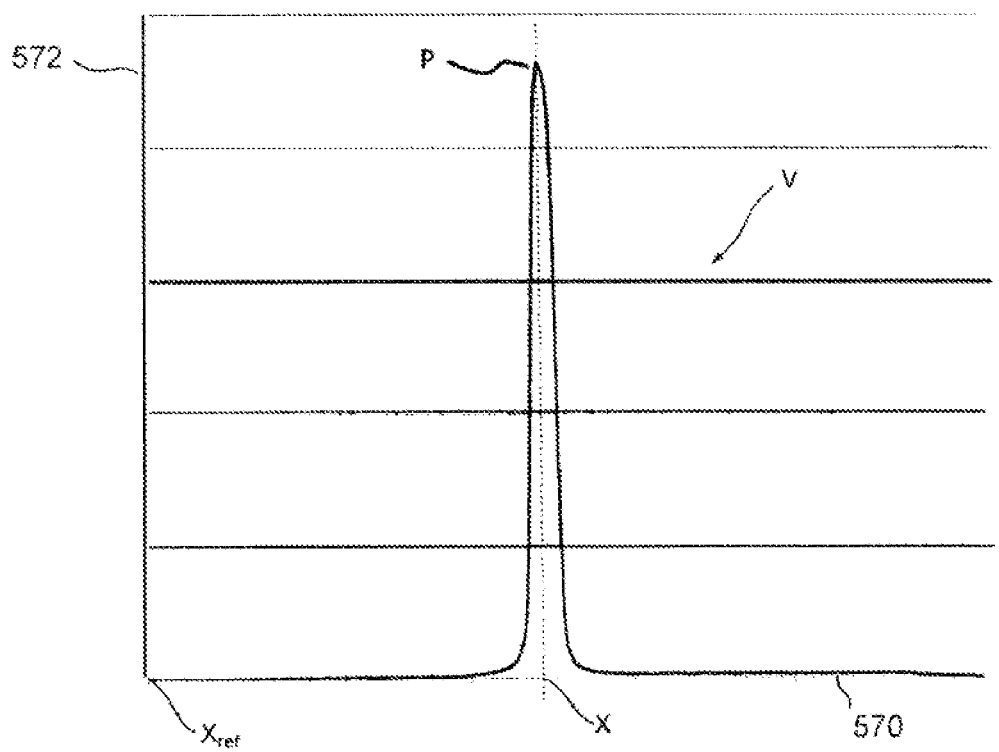
FIG. 7 shows an intensity distribution detected by the position-sensitive detector of the device according to FIG. 3 for distance determination.

FIG. 7 shows the corresponding intensity distribution V produced by the reflection light beam 366a on the position-sensitive detector 372. The intensity distribution V shows one peak P, whose position X determined on the position-sensitive detector 372 with respect to a reference position $X_{ref}$, is a measure of the distance z—shown in FIG. 6—between the front surface 464 of the cover glass 424 and the objective 110 along the optical axis O. In this case, the front surface 464 of the cover glass 424 forms the reference plane mentioned above. On the basis of the position X, the distance z can thus be determined in situ.

In this embodiment, the two degrees of freedom, i.e. the correction adjustment and the zoom adjustment, are no longer fixedly coupled to one another. By virtue of the detecting device 240 detecting both the distance between the telescope system 104 and the reference plane and the object-side refractive index, an optimum correction of the volume imaging can be achieved in an automated manner for every position along the optical axis O within the object 106.

Figure 8:
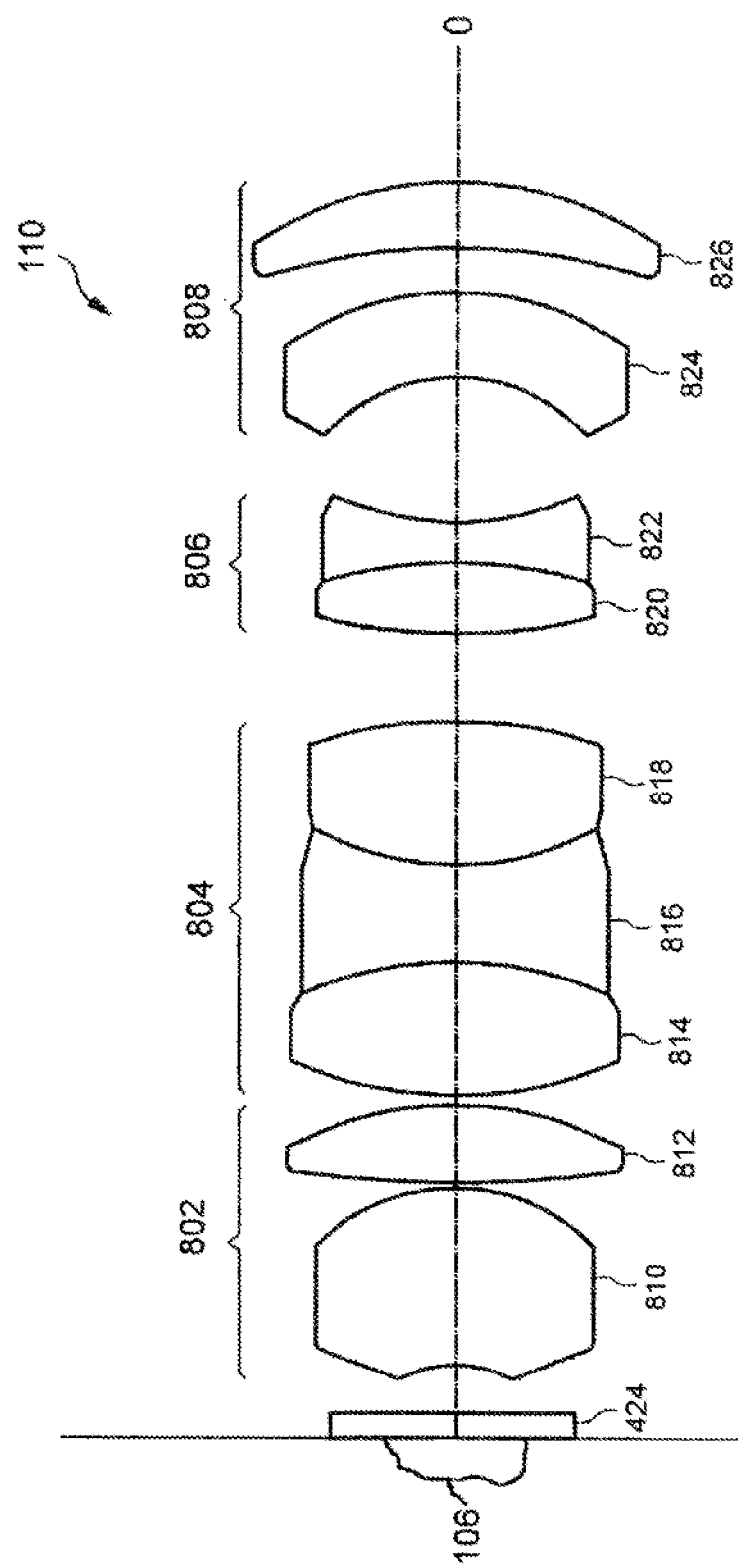
FIG. 8 shows a lens diagram of the object-side objective of the optical system as an exemplary embodiment.

FIG. 8 shows one exemplary embodiment of the objective 110, in which the correction unit intended for correcting the spherical imaging aberration is integrated.

In the exemplary embodiment according to FIG. 8, the objective 110 comprises a first lens group 802 of positive refractive power, a second lens group 804 of positive refractive power, a third lens group 806 of negative refractive power and a fourth lens group 808 of positive refractive power, which are arranged in this order proceeding from the object side. The second lens group 804 is adjustable along the optical axis O in order to correct the spherical aberration by means of the controller 134. By contrast, the first lens group 802, the third lens group 806 and the fourth lens group 808 are stationary.

The first lens group 802 is formed from a first lens 810 of negative refractive power and a second lens 812 of positive refractive power. The axially movable lens group 804 comprises a third lens 814 of positive refractive power, a fourth lens 816 of negative refractive power and a fifth lens 818 of positive refractive power. The lenses 814, 816 and 818 form a cemented component. The third lens group 806 comprises a sixth lens 820 of positive refractive power and a seventh lens 822 of negative refractive power. The lenses 820, 822 also form a cemented component. Finally, the fourth lens group 808 is formed from an eighth lens 824 of negative refractive power and a ninth lens 826 of positive refractive power.

Figure 9:
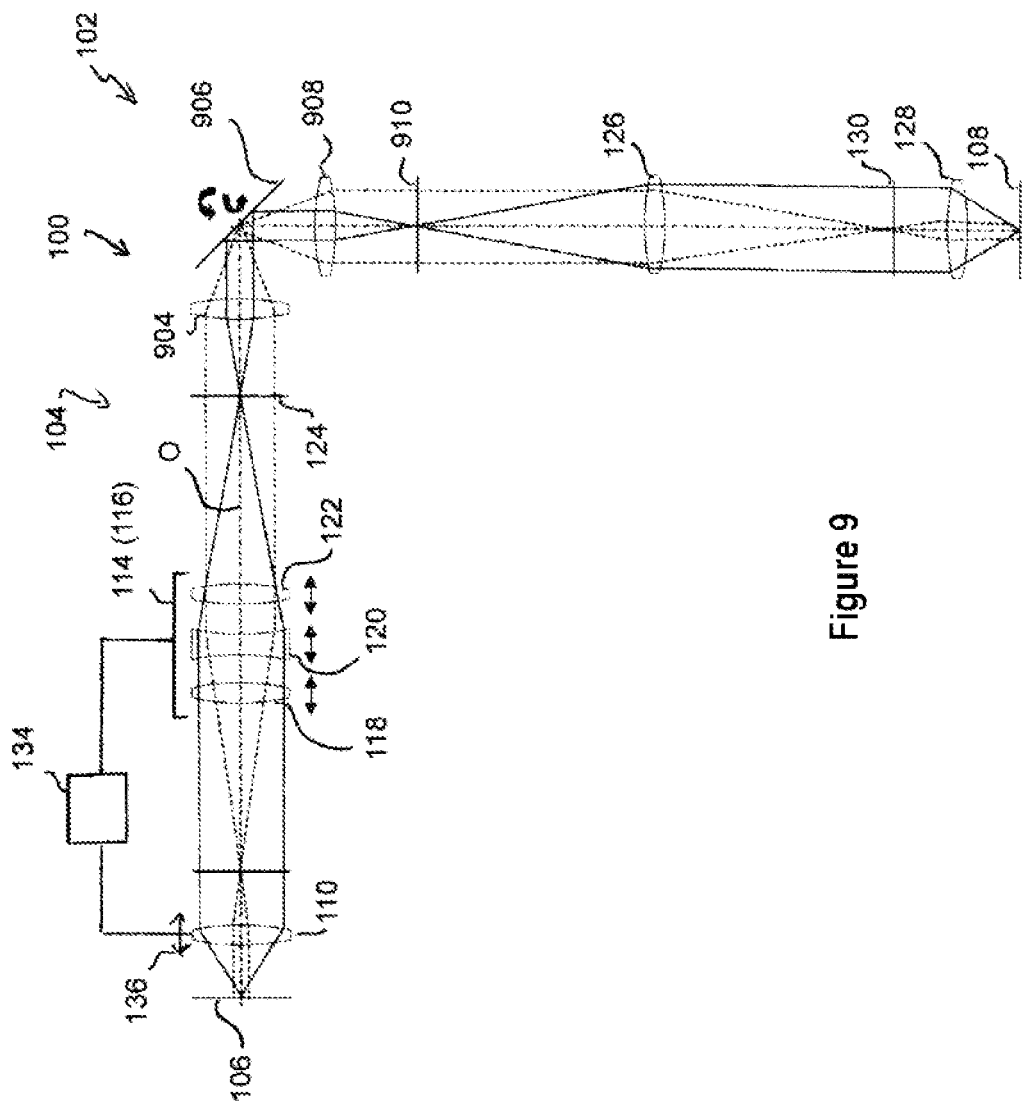
FIG. 9 shows a schematic illustration of the microscope containing an optical system in accordance with a further exemplary embodiment.

FIG. 9 shows a further exemplary embodiment of the optical system 100, wherein the telescope system 104 has a further Kepler telescope system. The latter comprises, proceeding from the object side toward the image side, a first eyepiece system 904, a light deflecting device 906 and a second eyepiece system 908. The light deflecting device 906 is formed from a scanning mirror, for example, which can rotate about two axes perpendicular to one another, as is indicated by the two arrows in FIG. 9. In this case, the light deflecting device is arranged at the location of an intermediate pupil. Furthermore, a further intermediate image plane 910 is provided in the telescope system 104 according to FIG. 9.

Apart from the additional Kepler telescope system, the embodiment according to FIG. 9 corresponds to the embodiment illustrated in FIG. 1. In particular, the embodiment according to FIG. 9 is also designed for a coupled adjustment of the correction unit and the zoom optical unit 114.

Figure 10:
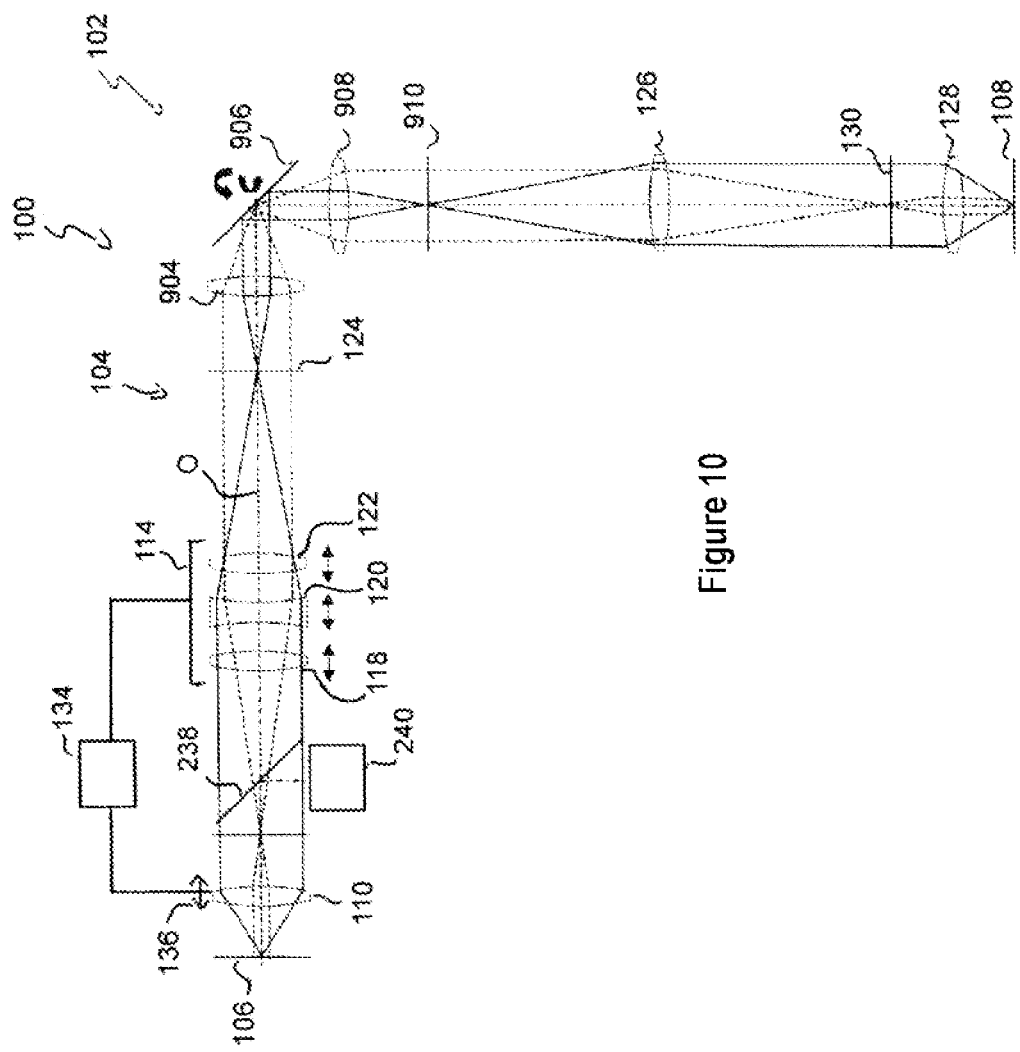
FIG. 10 shows a schematic illustration of a modified embodiment of the microscope according to FIG. 9.

FIG. 10 shows a further exemplary embodiment, wherein, in contrast to the configuration illustrated in FIG. 9, the two degrees of freedom, namely the correction adjustment and the zoom adjustment, are controlled independently of one another. Accordingly, the embodiment according to FIG. 10 also has the detecting device 240 (corresponding to the embodiment illustrated in FIG. 2).

Figure 11:
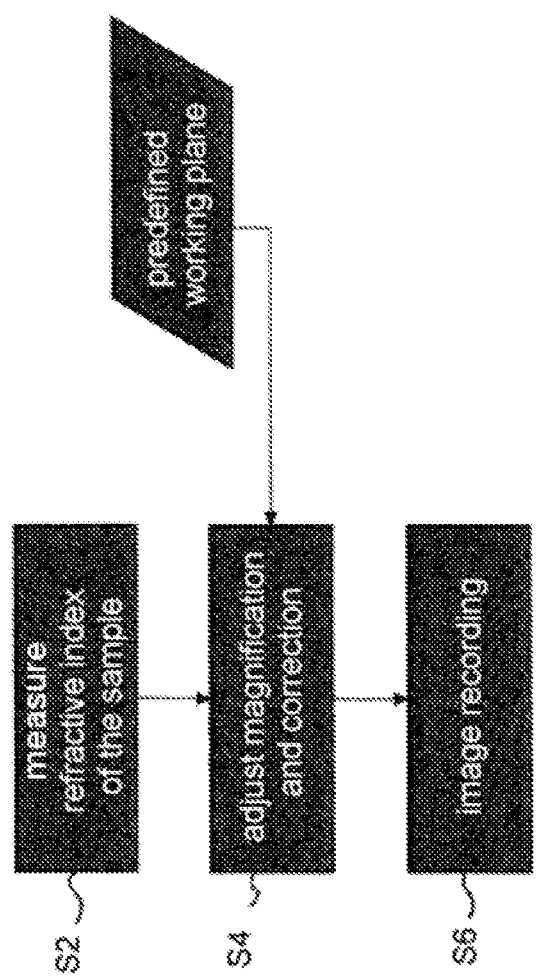
FIG. 11 shows a flow diagram showing an adjusting method as an exemplary embodiment, wherein an optical correction unit and a zoom optical unit are driven in a coupled manner.

FIG. 11 shows a flow diagram that elucidates an adjusting method in which the optical correction unit, i.e. the second lens group 804 of the objective 110 (cf. FIG. 8), and the zoom optical unit 114 are driven in a coupled manner.

Firstly, in step S2, the refractive index in the object space is measured. In the example according to FIG. 11, here the refractive index of the object itself is intended to be determined.

Depending on the refractive index detected in step S2, the coupled driving of the lens group 804 of the objective 110 and of the zoom optical unit 114 is subsequently effected in step S4. In this case, the adjustment performed in step S4 is based on the predefinition of a fixed working plane on which the telescope system 104 is focused. This is because only this predefinition of a predefined working plane makes it possible to implement a fixed coupling between zoom and correction adjustments, as a result of which the sole remaining degree of freedom correlates only with the refractive index, but not with the imaging depth within the object.

In step S6, finally, the image recording is carried out on the basis of the zoom and correction adjustments performed in step S4.

Figure 12:
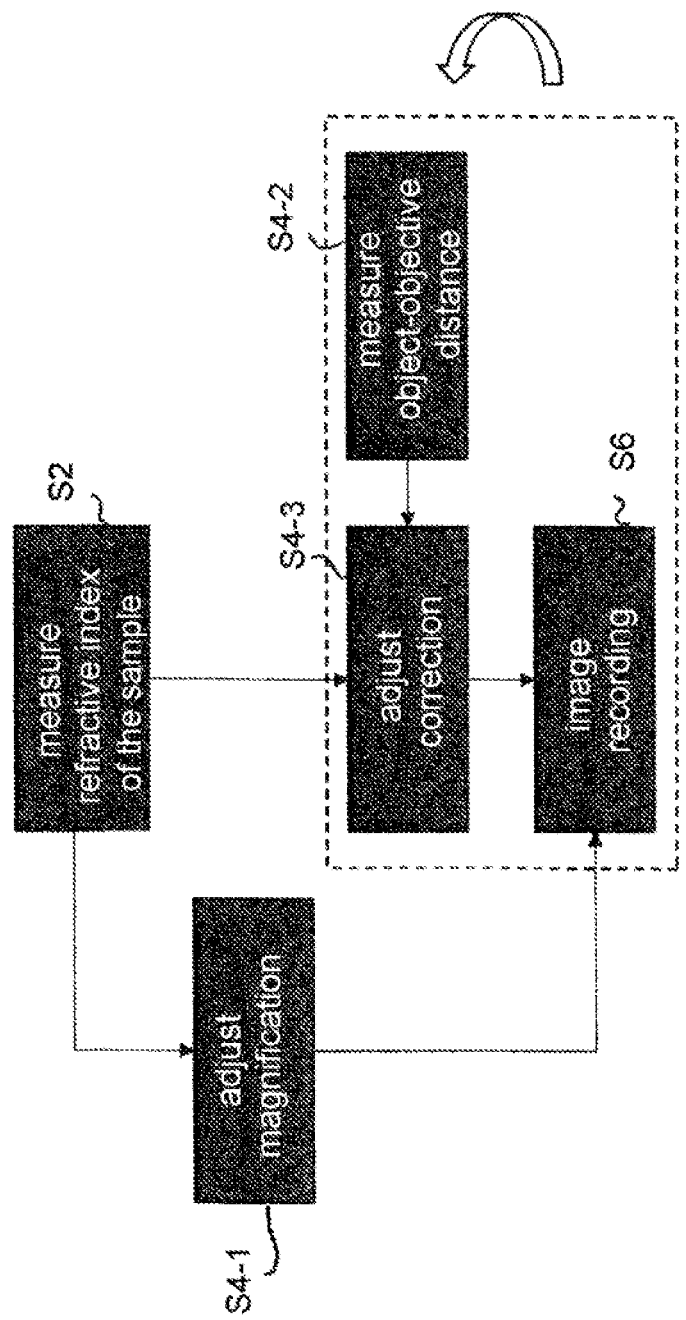
FIG. 12 shows a flow diagram showing an adjusting method as a further exemplary embodiment, wherein the optical correction unit and the zoom optical unit are driven independently of one another.

FIG. 12 shows a flow diagram for elucidating an adjusting method in which the optical correction unit, i.e. in the present exemplary embodiment the second lens group 804 of the objective 110, and the zoom optical unit 114 are driven independently of one another.

In step S2, once again the object-side refractive index is measured using the detecting device 240. Afterward, in step S4-1, the magnification is adjusted by the zoom optical unit 114 being controlled depending on the refractive index detected in S2.

In contrast to the exemplary embodiment illustrated in FIG. 11, in the method according to FIG. 12, the distance between the object 106 and the objective 110 is additionally determined using the detecting device 240. This is done for example with reference to a specific reference plane defined by the cover glass 424, as has been explained further above with reference to FIGS. 6 and 7. In step S4-3, the correction adjustment is then carried out by the optical correction unit being moved along the optical axis O of the objective 110 in a manner dependent on said distance.

Finally, in step S6, the image recording is effected on the basis of the adjustments performed in steps S4-1 and S4-3.

In the example according to FIG. 12 it is assumed that the adjustment of the zoom optical unit 114 can be performed independently of the imaging depth, i.e. independently of the distance between the objective 110 and the object 106. Accordingly, in the magnification adjustment performed in step S4-1, only the refractive index detected in step S2 is taken into account, but not the distance detected in step S4-2. It goes without saying, however, that the distance detected in step S4-2 can also be taken into account in the adjustment of the magnification in step S4-1, should this be advantageous.

Figure 13:
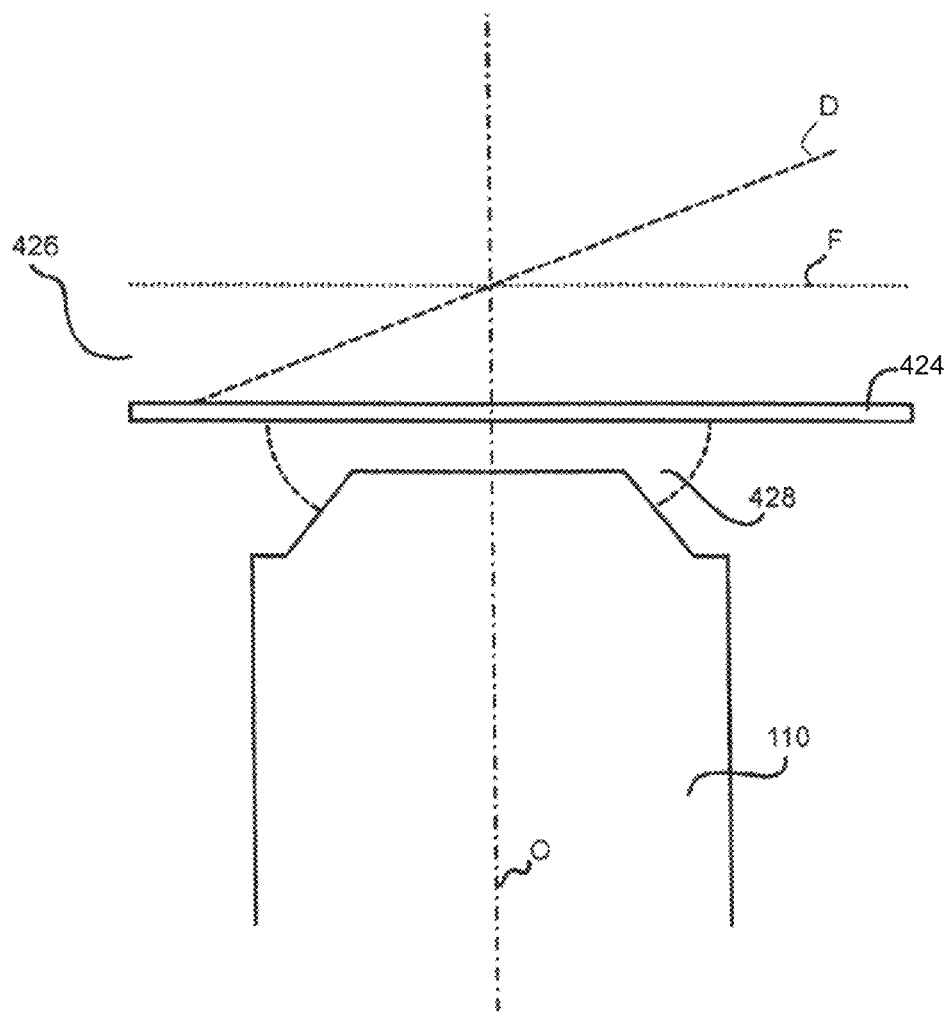
FIG. 13 shows a schematic illustration for elucidating how a working plane is defined in an OPM or SCAPE configuration.

Finally, FIG. 13 shows, in a schematic illustration, how a working plane can be defined in the case of a coupled correction adjustment and zoom adjustment if the microscope 100 is operated for volume imaging in an OPM or SCAPE configuration, for example.

As in FIG. 6, in the example according to FIG. 13 it is assumed that the objective 110 is oriented with its optical axis O perpendicular to the cover glass 424. In this case, in FIG. 13, the immersion medium 428 is situated below the cover glass 424 and the embedding medium 426 is situated above the cover glass 424, the object (not explicitly illustrated in FIG. 13) being embedded in said embedding medium.

In the configuration according to FIG. 13, the abovementioned working plane is defined by that plane within the object 106 on which the objective 110 is focused. This focal plane is designated by F in FIG. 13 and is perpendicular to the optical axis O of the objective 110.

In an OPM or SCAPE configuration, the objective 110 is used not only for imaging the object 106 but also for illuminating the latter. In this case, the objective 110 generates a light sheet oriented obliquely with respect to the optical axis O of the objective 110. In this specific configuration, this inclination of the light sheet is compensated for by a detection plane D being correspondingly inclined relative to the optical axis O of the objective 110. Said detection plane D defines that plane within the object 106 which is imaged onto an image sensor used for image generation.

The projection of the detection plane D onto the optical axis O defines the imaging depth the volume imaging, i.e. the extent of the imaged sample volume along the optical axis O. The position of the working plane defined by the focal plane F of the objective 110 can then be chosen suitably with respect to the detection plane D. In the example according to FIG. 13, the focal plane F of the objective 110 is positioned with respect to the detection plane D in such a way that it lies along the optical axis O approximately centrally within the imaging depth defined by the detection plane D. It goes without saying, however, that this definition should be understood to be only by way of example. Taking account of possible absorption or scattering effects which, by their nature, increase with the imaging depth, the working plane can also be defined in a different way with respect to the detection plane D.

It goes without saying that the embodiments described above should be understood to be only by way of example. In this regard, for instance, the detecting device 240 shown in FIG. 3 merely represents one specific example of how the refractive index and/or the distance between the telescope system 104 and a reference plane can be determined. On no account, however, is the determination of the refractive index and/or of the distance intended to be restricted to this example.

Although some aspects have been described in the context of a device, it is clear that these aspects also constitute a description of the corresponding method, wherein a block or a device corresponds to a method step or a function of a method step. Analogously to this, aspects described in the context of a method step also constitute a description of a corresponding block or element or a property of a corresponding device. Some or all method steps can be carried out by (or using) a hardware device, which may be for example a processor, a microprocessor, a programmable computer or an electronic circuit. In some exemplary embodiments, one or more of the most important method steps can be carried out by such a device.

Depending on specific implementation requirements, exemplary embodiments of the invention can be implemented using hardware or software. The implementation can be effected with a nonvolatile storage medium such as a digital storage medium, such as, for example, a floppy disk, a DVD, a Blu-ray, a CD, a ROM, a PROM and an EPROM, an EEPROM or a FLASH memory, on which are stored electronically readable control signals which interact (or can interact) with a programmable computer system such that the respective method is carried out. Therefore, the digital storage medium can be computer-readable.

Some exemplary embodiments according to the invention comprise a data carrier with electronically readable control signals which can interact with a programmable computer system, such that one of the methods described herein is carried out.

In general, exemplary embodiments of the present invention can be implemented as a computer program product with a program code, wherein the program code is effective for carrying out one of the methods when the computer program product runs on a computer. The program code can be stored on a machine-readable carrier, for example.

Further exemplary embodiments comprise the computer program for carrying out one of the methods described herein, which is stored on a machine-readable carrier.

In other words, one exemplary embodiment of the present invention is therefore a computer program with a program code for carrying out one of the methods described herein when the computer program runs on a computer.

A further exemplary embodiment of the present invention is therefore a storage medium (or a data carrier or a computer-readable medium) comprising a computer program stored thereon for carrying out one of the methods described herein when it is executed by a processor. The data carrier, the digital storage medium or the recorded medium are generally tangible and/or not transitionless. A further exemplary embodiment of the present invention is a device, as described herein, which comprises a processor and the storage medium.

A further exemplary embodiment of the invention is therefore a data stream or a signal sequence that constitutes the computer program for carrying out one of the methods described herein. The data stream or the signal sequence can be configured for example so as to be transmitted via a data communication connection, for example via the Internet.

A further exemplary embodiment comprises a processing means, for example a computer or a programmable logic device, which is configured or adapted to carry out one of the methods described herein.

A further exemplary embodiment comprises a computer on which the computer program for carrying out one of the methods described herein is installed.

A further exemplary embodiment according to the invention comprises a device or a system configured to transmit (for example electronically or optically) a computer program for carrying out one of the methods described herein to a receiver. The receiver can be for example a computer, a mobile device, a storage device or the like. The device or the system can comprise for example a file server for transmitting the computer program to the receiver.

In some exemplary embodiments, a programmable logic device (e.g. a field programmable gate array, FPGA) can be used to implement some or all functionalities of the methods described herein. In some exemplary embodiments, a field programmable gate array can cooperate with a microprocessor in order to carry out one of the methods described herein. In general, the methods are preferably carried out by any hardware device.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Optical system
102 Microscope
104 Telescope system
106 Object
108 Image
110 Objective
112 Focal plane
114 Zoom optical unit
116 Tube lens unit
118 Lens unit
120 Lens unit
122 Lens unit
124 Intermediate image plane
126 Tube lens unit
128 Objective
130 Focal plane
132 Kepler telescope system
134 Controller
136 Focusing device
238 Splitter mirror
240 Detecting device
342 Light source
344 Measurement light beam
346 Slit stop
348 Illumination optical unit
350 Aperture stop
352 Stop opening
354 Deflection prism
356 Transport optical unit
358 Focusing lens
360 Stray light stop
362 Lens
364 Entrance pupil
366 reflection light beam
368 Detector optical unit
370 Spectral filter
372 Detector
424 Cover glass
426 Embedding medium
428 Immersion medium
464 Front surface
466 Part of the measurement light beam
468 Rear surface
570 Abscissa
572 Ordinate
802 Lens group
804 Lens group
806 Lens group
808 Lens group
810 Lens
812 Lens
814 Lens
816 Lens
818 Lens
820 Lens
822 Lens
824 Lens
826 Lens
904 Eyepiece system
906 Light deflecting device
908 Eyepiece system
910 Intermediate image plane
O Optical axis
O1 Optical axis
O2 Optical axis
F Focal plane
D Detection plane
α Angle
β Angle

The invention claimed is:

1. An optical system for a microscope for imaging an object, the optical system comprising:
    a telescope system comprising:
        an optical correction unit, the optical correction unit being adjustable in order to correct a spherical imaging aberration, and
        a zoom optical unit, the zoom optical unit being adjustable in order to adapt a magnification of the telescope system to a ratio of a first refractive index and a second refractive index, the first refractive index being assigned to an object side of the telescope system, and the second refractive index being assigned to an image side of the telescope system, wherein the magnification of the telescope system is within a predetermined magnification range, an input device for inputting the first refractive index to a controller, and the controller configured to adjust the optical correction unit and the zoom optical unit based on the first refractive index, wherein the telescope system is telecentric over the predetermined magnification range, both with respect to the object side of the telescope system and with respect to the image side of the telescope system, by the zoom optical unit contained in the telescope system.

2. The optical system of claim 1, wherein the telescope system comprises a first objective facing the object side of the telescope system and a second objective facing the image side of the telescope system, and wherein the zoom optical unit is configured to image a focal plane of the first objective that faces an image side of the first objective onto a focal plane of the second objective that faces an object side of the second objective over the predetermined magnification range.

3. The optical system of claim 2, wherein the optical correction unit is contained in the first objective or in the second objective.

4. The optical system of claim 2, wherein the telescope system comprises a Kepler telescope system arranged between the first objective and the second objective, the zoom optical unit being contained in the Kepler telescope system.

5. The optical system of claim 4, wherein the Kepler telescope system comprises a first tube lens unit and a second tube lens unit, the first tube lens unit forming the zoom optical unit.

6. The optical system of claim 4, wherein the zoom optical unit comprises at least three lenses that are movable along an optical axis of the telescope system to change the magnification of the telescope system.

7. The optical system of claim 6, further comprising:

a focusing device configured to move the first objective along the optical axis relative to the object, thereby changing a distance between the first objective and the Kepler telescope system, wherein the three lenses of the zoom optical unit are movable along the optical axis independently of one another such that, as the distance between the first objective and the Kepler telescope system changes, the focal plane of the first objective that faces the image side of the first objective is imaged onto the focal plane of the second objective that faces the object side of the second objective while maintaining the magnification adjusted by the zoom optical unit and an afocality of the telescope system.

8. The optical system of claim 1, wherein the predetermined magnification range of the telescope system is greater than 1.0 and less than or equal to 1.6.

9. The optical system of claim 1, wherein the controller is configured to adjust the optical correction unit and the zoom optical unit coupled to one another based on the first refractive index.

10. The optical system of claim 1, further comprising:

a detection device configured to detect a distance between the telescope system and a reference plane defining a position of the object relative to the telescope system, wherein the controller is configured to adjust at least the optical correction unit additionally based on the distance detected by the second detection device.

11. A microscope, comprising the optical system of claim 1.

12. A method for imaging an object using a microscope having a telescope system with an optical correction unit and a zoom optical unit, the method comprising:

adjusting the zoom optical unit to adapt a magnification of the telescope system within a predetermined magnification range to a ratio of a first refractive index and a second refractive index, the first refractive index being assigned to an object side of the telescope system, and the second refractive index being assigned to an image side of the telescope system; and adjusting the optical correction unit based on the first refractive index to correct a spherical imaging aberration.

13. The method of claim 12, further comprising detecting the first refractive index.

14. The method of claim 13, further comprising detecting a distance between the telescope system and a reference plane defining a position of the object relative to the telescope system, wherein the optical correction unit is adjusted additionally based on the distance.

15. The method of claim 12, wherein the predetermined magnification range of the telescope system is greater than 1.0 and less than or equal to 1.6.

* * * * *